United States Patent
Sonowal et al.

(10) Patent No.: US 12,333,315 B2
(45) Date of Patent: Jun. 17, 2025

(54) APPARATUSES, COMPUTER-IMPLEMENTED METHODS, AND COMPUTER PROGRAM PRODUCTS FOR IT/OT CONFIGURATION HISTORIZATION

(71) Applicant: Honeywell International Inc., Charlotte, NC (US)

(72) Inventors: Abhinab Sonowal, Bangalore (IN); Dipanjan Saha, Bangalore (IN); Arnab Bhattacharjee, Bangalore (IN); Nikhil Bansal, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 84 days.

(21) Appl. No.: 18/299,445

(22) Filed: Apr. 12, 2023

(65) Prior Publication Data
US 2024/0345848 A1 Oct. 17, 2024

(51) Int. Cl.
*G06F 16/00* (2019.01)
*G06F 9/445* (2018.01)
*G06F 16/14* (2019.01)

(52) U.S. Cl.
CPC .......... *G06F 9/44505* (2013.01); *G06F 16/14* (2019.01)

(58) Field of Classification Search
CPC ............................. G06F 9/44505; G06F 16/14
See application file for complete search history.

(56) References Cited

U.S. PATENT DOCUMENTS

| | | | |
|---|---|---|---|
| 8,495,005 B2* | 7/2013 | Morris | G06F 16/24556 707/723 |
| 2017/0220964 A1* | 8/2017 | Datta Ray | H04L 63/1433 |
| 2020/0041994 A1* | 2/2020 | Alalao | H04W 4/40 |
| 2021/0097067 A1* | 4/2021 | Virtuoso | G06F 16/2455 |
| 2021/0286947 A1* | 9/2021 | Pajak | G06F 40/284 |
| 2022/0094928 A1* | 3/2022 | Amirpour | H04N 19/436 |
| 2023/0418963 A1* | 12/2023 | Yasrebi | G06F 21/6218 |
| 2024/0031514 A1* | 1/2024 | Yu | G01N 21/27 |
| 2024/0208669 A1* | 6/2024 | Thornberg | G06T 11/00 |
| 2024/0272943 A1* | 8/2024 | Tadkase | G06F 11/0757 |
| 2024/0273956 A1* | 8/2024 | Niu | G07C 5/008 |

FOREIGN PATENT DOCUMENTS

WO WO-2018011791 A2 * 1/2018 ............. B64D 43/00

* cited by examiner

*Primary Examiner* — Alexander Khong
(74) *Attorney, Agent, or Firm* — Alston & Bird LLP

(57) ABSTRACT

Computer-implemented methods, systems, computing devices, and/or the like are provided. The computer-implemented method may include identifying a raw representation of the source data and a processed representation of the source data; selecting a read mode for reading the raw representation of the source data and the processed representation of the source data; selecting a write mode for writing the raw representation of the source data and the processed representation of the source data, wherein the write mode is based at least in part on the read mode; selecting a process mode for processing the source data, wherein the process mode is based at least in part on the write mode; selecting a representation mode for representing the processed source data; and storing the raw representation of the source data and the processed representation of the source data based at least in part on the representation mode.

18 Claims, 14 Drawing Sheets

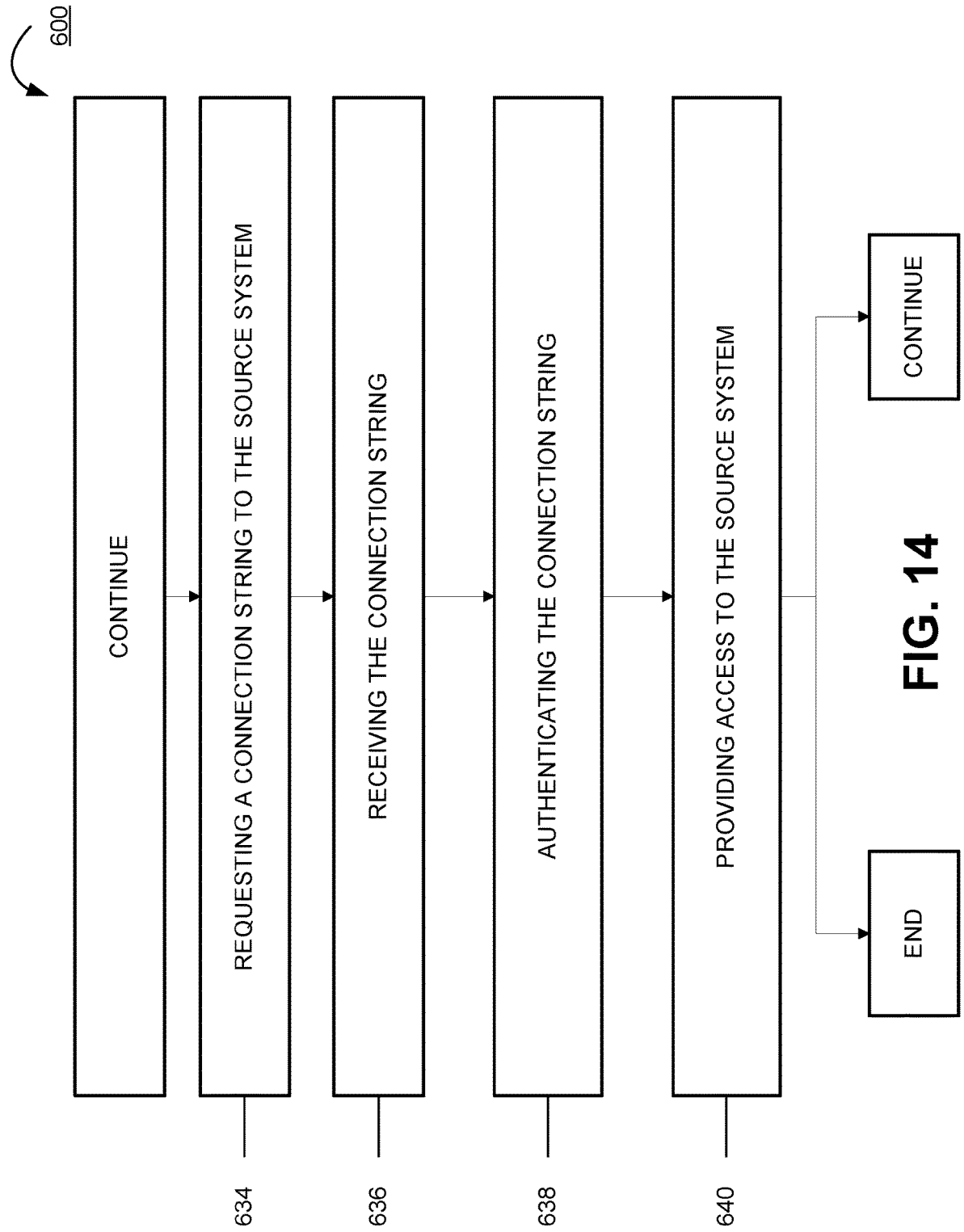

APPARATUSES, COMPUTER-IMPLEMENTED METHODS, AND COMPUTER PROGRAM PRODUCTS FOR IT/OT CONFIGURATION HISTORIZATION

TECHNICAL FIELD

Embodiments of the present disclosure are generally directed to onboarding data from a source, and specifically to applying IT or OT data to a configuration historization plan to configure the source data for improved storage.

BACKGROUND

Descriptive, predictive, or prescriptive analytics systems depend on a historical and continuous flow of observation data from a source system as well as configuration change data corresponding to such source system(s) and/or data. Any software-as-a-service (SaaS) based information technology (IT) and operational technology (OT) analytics may desire to maintain proper configuration historized data for the different IT and OT systems that any customer, plant, or site uses for any given IT or OT functional area. In this regard, for any given functional area, different IT or OT systems will have as varied configuration record structures as these IT or OT systems in circumstances where they are supplied by different vendors and/or where the configuration change behavior differs across systems and/or across time.

Through applied effort, ingenuity, and innovation, the Applicant has solved problems relating to IT/OT configuration historization, such as configuring source data and applying IT or OT data to a configuration historization plan, by developing solutions embodied in the present disclosure, which are described in detail below.

SUMMARY

In general, embodiments of the present disclosure provide computer-implemented methods, systems, computing devices, and/or the like.

In accordance with various embodiments of the present disclosure, there is provided a computer-implemented method for configuring source data from a source system, the computer-implemented method including: identifying a raw representation of the source data and a processed representation of the source data; selecting a read mode for reading the raw representation of the source data and the processed representation of the source data, wherein the read mode is based at least in part on the identified raw representation and the processed representation of the source data; selecting a write mode for writing the raw representation of the source data and the processed representation of the source data, wherein the write mode is based at least in part on the read mode; selecting a process mode for processing the source data, wherein the process mode is based at least in part on the write mode; selecting a representation mode for representing the processed source data; and storing the raw representation of the source data and the processed representation of the source data based at least in part on the representation mode.

In some embodiments, the computer-implemented method further includes receiving operational technology (OT) data; applying the OT data to a configuration historization plan, wherein the configuration historization plan is configured to provide a raw representation and a processed representation of the OT data; and storing the raw representation and the processed representation of the OT data.

In some embodiments, the processed representation of the source data includes configuration data indicative of a type of configuration utilized to map a plurality of source data types to a shared processed representation, wherein the shared processed representation represents each source data type of the plurality of source data types in an identical configuration.

In some embodiments, the processed representation includes data indicative of a current configuration utilized to store at least a portion of the source data at a time that the portion of the source data was stored.

In some embodiments, the computer-implemented method further includes providing a business key or a foreign key including metadata about the raw representation of the source data or the processed representation of the source data.

In some embodiments, the computer-implemented method further includes setting a frequency time for refreshing the computer-implemented method for configuring the source data from the source system; and refreshing the computer-implemented method for configuring the source data from the source system at the frequency time.

In some embodiments, the computer-implemented method further includes changing a type of the source data after providing a preview of the raw representation of the source data and the processed representation of the source data, wherein the preview is configured to identify at least a portion of the raw representation of the source data and at least a portion of the processed representation of the source data.

In some embodiments, the computer-implemented method further includes validating the processed source data.

In some embodiments, the computer-implemented method further includes setting at least one identifier for the raw representation of the source data and processed representation of the source data.

In some embodiments, the computer-implemented method further includes setting a type for the source data.

In some embodiments, the source data includes at least one CSV file or at least one SQL Server DB.

In some embodiments, the computer-implemented method further includes requesting a connection string to connect to the source system, receiving the connection string, authenticating the connection string, and providing access to the source system based at least in part on the authenticating the connection string.

In some embodiments, the connection string includes a user identification and password.

In some embodiments, the read mode includes a full mode and a delta mode, wherein the delta mode indicate a watermark including a data type selected from a group consisting of int, float, and timestamp.

In some embodiments, the write mode includes truncate/load, append, change data capture, and merge.

According to various embodiments, there is provided a computer program product for configuring source data from a source system, the computer program product including at least one non-transitory computer-readable storage medium having computer program code stored thereon that, in execution with at least one processor, is configured for: selecting a read mode for reading the raw representation of the source data and the processed representation of the source data, wherein the read mode is based at least in part on the identified raw representation and the processed representation of the source data; selecting a write mode for writing the raw representation of the source data and the processed representation of the source data, wherein the write mode is based at least in part on the read mode; selecting a process mode for processing the source data, wherein the process mode is based at least in part on the write mode; selecting a representation mode for representing the processed source data; and storing the raw representation of the source data and the processed representation of the source data based at least in part on the representation mode.

In some embodiments, the at least one processor is configured for: receiving operational technology (OT) data; applying the OT data to a configuration historization plan, wherein the configuration historization plan is configured to provide a raw representation and a processed representation of the OT data; and storing the raw representation and the processed representation of the OT data.

In some embodiments, the processed representation of the OT data includes configuration data indicative of a type of configuration utilized to map a plurality of OT data types to a shared processed representation, wherein the shared processed representation represents each OT data type of the plurality of OT data types in an identical configuration.

According to various embodiments, there is provided an apparatus for configuring source data from a source system, the apparatus including at least one processor and at least one non-transitory memory including computer-coded instructions thereon, wherein the computer coded instructions, with the at least one processor, cause the apparatus to: selecting a read mode for reading a raw representation of the source data and a processed representation of the source data, wherein the read mode is based at least in part on the identified raw representation and the processed representation of the source data; selecting a write mode for writing the raw representation of the source data and the processed representation of the source data, wherein the write mode is based at least in part on the read mode; selecting a process mode for processing the source data, wherein the process mode is based at least in part on the write mode; selecting a representation mode for representing the processed source data; and storing the raw representation of the source data and the processed representation of the source data based at least in part on the representation mode.

In some embodiments, the computer coded instructions, with the at least one processor, are further configured to cause the apparatus to: receive operational technology (OT) data; apply the OT data to a configuration historization plan, wherein the configuration historization plan is configured to provide a raw representation and a processed representation of the OT data; and store the raw representation and the processed representation of the OT data.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 14 illustrates an example flow chart for configuring source data from a source system in accordance with at least some example embodiments of the present disclosure.

DETAILED DESCRIPTION OF SOME EXAMPLE EMBODIMENTS

Figure 1:
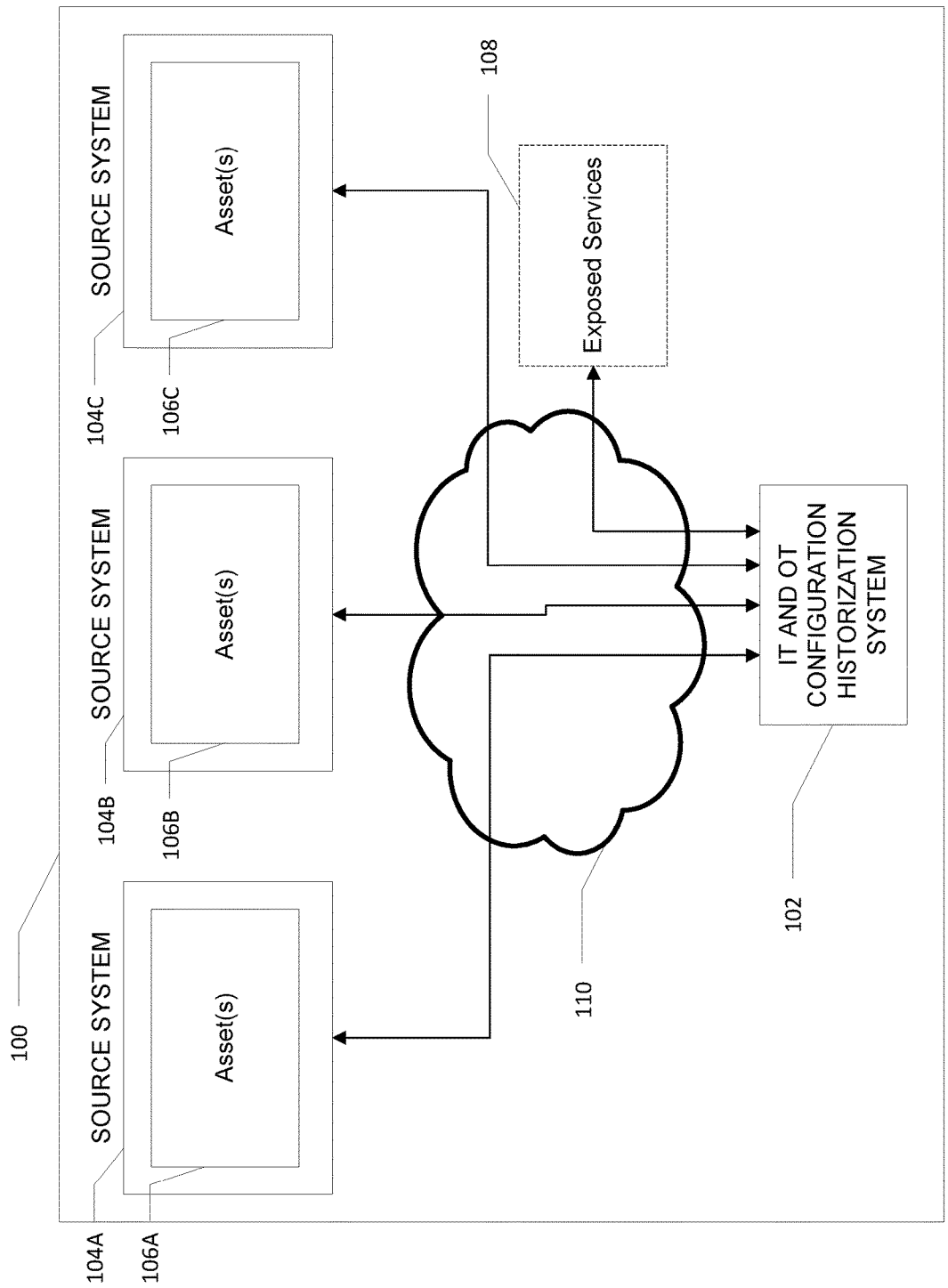
FIG. 1 illustrates a block diagram of a system that may be specially configured within which embodiments of the present disclosure may operate.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

According to various embodiments, different source systems capture, store, and represent source data differently on their respective systems. In some embodiments, source data may include observation data recorded by a particular source system and/or is based on particular configuration data that is stored on or associated with that source system, where the configuration data contextualizes the observed data. For example, such source data may include IT or OT data. Differences in the ways that various source systems store or otherwise configure source data may make comparisons or other analysis between various data portions computationally impossible, for example as it may not be possible to link together different portions of data for comparison. Additionally or alternatively, it may be difficult to efficiently analyze source data across various associated source systems. In this regard, embodiments of this disclosure provide for improved IT/OT configuration historization for synthesizing source data from various source systems, including where such various systems have different ways of storing source data.

For simplicity, this section will refer to an example system, although the following processes may be implemented on or adapted to an example apparatus, computer program, method, or the like. An example system for historizing source data in some embodiments includes a processor, non-transitory memory, various circuitry for communicating with the source systems, and any additional circuitry necessary for historizing the source data. In some embodiments, when the system receives the source data from the source system, it may store one or more representations of that source data, including a "raw data" representation embodying a copy of the raw data values of such source data and a "processed data" representation where the source data is separated into one or more defined portions, for example based at least in part on an onboarding plan. The system may then select from various modes in which to read the raw representation and/or to write the processed representation. These modes will be described in greater detail later in the specification. The system may select a mode for representing the processed source data, then store the raw representation of the source data and the processed representation of the source data accordingly. These stored source data may then be used to create a configuration historization plan, for example that is configured to synthesize data from the various different source systems such that their collective source data may be more uniformly exposed to users on various services.

In some embodiments, the system further applies data to the created configuration historization plan. For example, the system may receive subsequent OT data and apply it to the configuration historization plan, which is then utilized to provide a raw representation and a processed representation of the OT data. These representations may then be stored, for example in one or more data repositories for future processing.

Because portions of source data are being continually collected by their respective source systems, it will be necessary to continually update the configuration historization plan. These updates may be performed in batches of source data. In some embodiments, the system may be configured to set a frequency at which it repeats the aforementioned steps of creating a configuration historization plan but instead updates an existing configuration historization plan.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

"Asset" refers to any system or component of a system that operates to serve a particular function. Non-limiting asset examples include a manufacturing facility, a pump, a temperature sensor, and an alarm.

"Connection string" refers to electronically-managed data embodying authentication information that, upon validation, allows connection to a source system and reception of datasets from the source system.

"Dataset" refers to one or more data structures in tabular format configured to store or otherwise represent any number of data values in a source system. Datasets may include values relating to various assets. An example dataset could be a table containing a column listing the number of times a temperature alarm went off at a given manufacturing plant within a thirty day period. These datasets may also include a column having configuration data that contextualizes the values in the tables of data. Continuing with the previous example, the temperature alarm may be configured to emit a warning if the temperature within the plant rises about 70 degrees Fahrenheit.

"Exposed services" refers to one or more computing device(s) embodied in hardware, software, firmware, and/or any combination thereof, that are configured for providing processed data to at least one user. In some non-limiting examples, an exposed service exists on a user device, such as a smartphone, or on a remote system, such as a publicly or privately managed server available via the Internet.

"Processed data" refers to an electronically-managed representation of source data that are transformed via an example configuration historization system into a particular alternative format. In some embodiments processed data is represented in a format that is configured to be output via an exposed service.

"Raw data" refers to a copy of raw data values from source data that has been received by an example configuration historization system.

"Source data" refers to one or more datasets retrieved from one or more source systems. Source data in some embodiments is collected at least in part by source system(s) using one or more sensors, and/or in some embodiments is data that are input into source system(s) by an operator. Source data may be include observational data based on phenomena observed by the source system, and source data may also include configuration data that contextualizes the observational data.

"Source system" refers to one or more computing device(s) each embodied in hardware, software, firmware, and/or any combination thereof that includes or otherwise maintains access to one or more database(s) for storing one or more datasets that are associated with one or more assets. An example source system in some embodiments includes a database storing various alarm reports for a manufacturing plant. Another example source system may include a database storing maintenance reports for the various alarms at the same manufacturing plant from the previous example.

Example Systems and Apparatuses of the Disclosure

FIG. 1 illustrates a block diagram of a system 100 that may be specially configured within which embodiments of the present disclosure may operate. In some embodiments, the system 100 includes an IT and OT configuration and historization system that configures and/or historizes source data from one or more source systems 104A-C, each source system 104A-C including one or more asset(s) 106A-C, respectively. In some embodiments, the asset(s) 106A-C may be in wireless communication with the IT and OT configuration and historization system 102. In some embodiments, the IT and OT configuration historization system 102 may be in wireless communication with one or more exposed services 108 configured for receiving and displaying one or more outputs from the IT and OT configuration historization system. In some embodiments, the exposed services 108 may be displayed on a user device, such as a smart phone. In some embodiments, the asset(s) 106A, 106B, and/or 106C, the IT and OT configuration and historization system 102, and/or the exposed services 108 are communicable over one or more communications network(s), for example the communications network 110.

According to various embodiments, the communications network 110 nay be embodied in myriad network configurations. In some embodiments, the communications network 110 is a public network (e.g., the Internet). In some embodiments, the communications network 110 is a private network (e.g., an internal, localized, or closed-off network between particular devices). In some embodiments, the communications network 110 is a hybrid network (e.g., a network enabling internal communications between particular connected devices and external communications with other devices). The communications network 110 in some embodiments includes one or more base station(s), relay(s), router(s), switch(es), cell tower(s), communications cable(s) and/or associated routing station(s), and/or the like. In some embodiments, the communications network 110 includes one or more user controlled computing device(s) (e.g., a user owner router and/or modem) and/or one or more external utility devices (e.g., Internet service provider communication tower(s) and/or other device(s)).

In some embodiments, each of the components of the system 100 may be communicatively coupled to transmit data to and/or receive data from one another over the same or different wireless or wired networks embodying the communications network 110. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 110, the various embodiments are not limited to this particular architecture. In other embodiments, one or more computing entities share one or more components, hardware, and/or the like, or otherwise are embodied by a single computing device such that connection(s) between the computing entities are over the communications network 110 are altered and/or rendered unnecessary.

In some embodiments, each asset 106A-C performs a particular operational function within its corresponding source system 104A-C. Such an environment may embody any physical space that the asset may be located within or affect, such as a warehouse, a residence, an office, an outdoor space, and/or the like. Each asset may embody a component of a large system, such that the system is defined by a plurality of interoperable assets. In one example context where the source system 104A includes an HVAC system, for example, the asset 106A may embody a valve, pump, damper, or the like, that performs a particular function within the HVAC system. Alternatively, in one example context where the source system 104B includes an individual asset, for example, the asset(s) 106B may embody only the individual asset. In another non-limiting example, a source system 104C may include source data from a manufacturing plant and the asset 106C may be a temperature sensor within the manufacturing plant.

The IT and OT configuration historization system 102 includes any number of computing device(s) that perform one or more function(s) for receiving and processing source data from a source system 104A-C. In some embodiments, the IT and OT configuration historization system 102 includes one or more sub-systems for performing these tasks. In some other embodiments, a separate system from the IT and OT configuration historization system 102 may perform these function(s). In some embodiments, the IT and OT configuration historization system 102 embodies one or more cloud system(s) located remotely from one or more of the source systems 104A-C. Alternatively or additionally, in some embodiments, the IT and OT configuration historization system 102 embodies one or more on-premises systems located within the source systems 104A-C. In some embodiments, the different source systems 104A-C are each associated with a different configuration(s) and/or schema(s) that are processable to another representation.

In some embodiments, the exposed services 108 may be embodied by and/or otherwise displayed on a user device, including one or more computing device(s) accessible to an end user. In some embodiments, the user device includes a personal computer, laptop, smartphone, tablet, Internet-of-Things enabled device, smart home device, virtual assistant, alarm system, and/or the like. The user device may include a display, one or more visual indicator(s), one or more audio indicator(s) and/or the like that enables output from the IT and OT configuration historization system 102 to a user associated with the user device.

Figure 2:
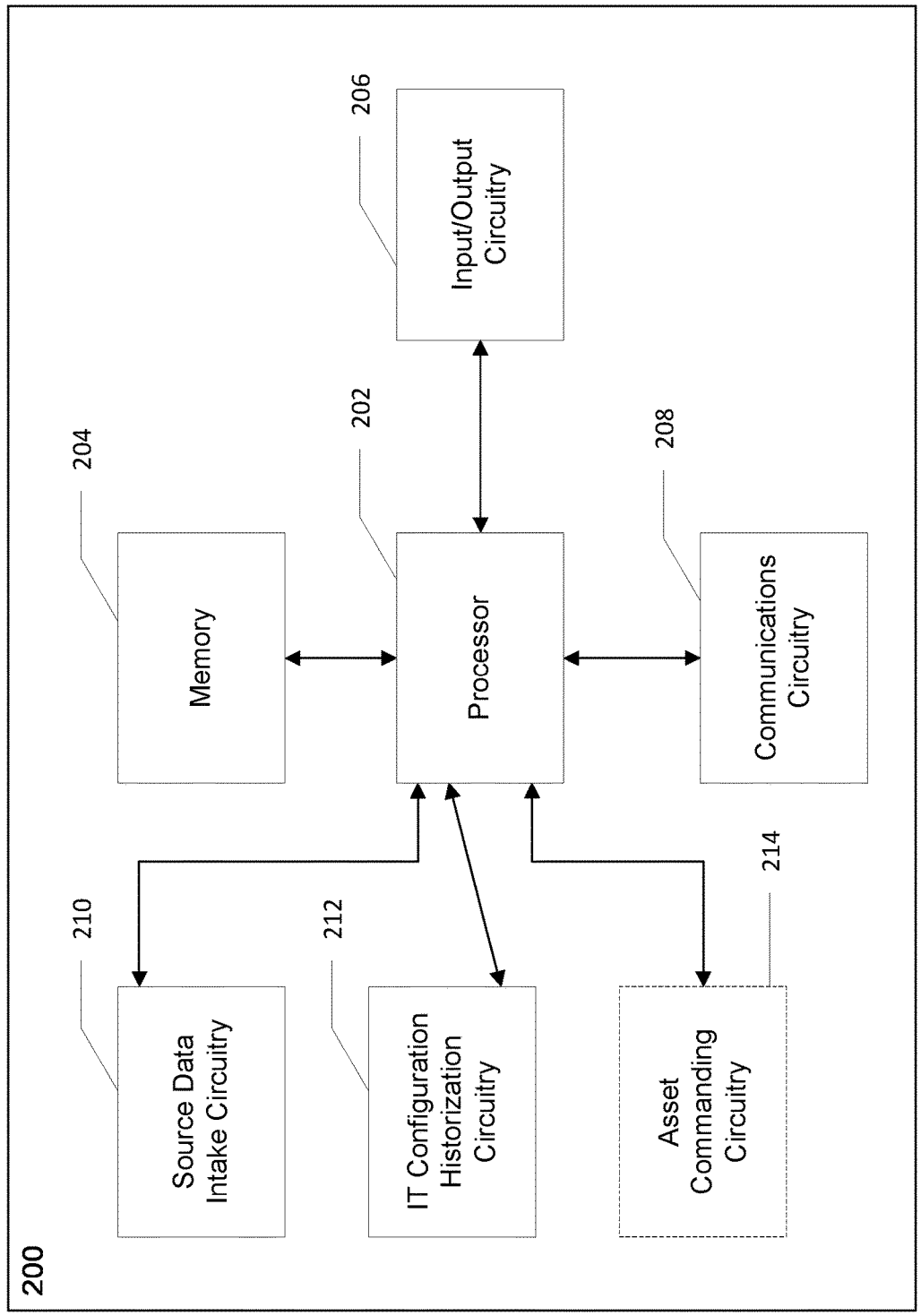
FIG. 2 illustrates a block diagram of an example apparatus that may be specially configured in accordance with at least some example embodiments of the present disclosure.

FIG. 2 illustrates a block diagram of an example apparatus 200 that may be specially configured in accordance with at least some example embodiments of the present disclosure. Specifically, FIG. 2 depicts an example IT and OT configuration historization apparatus 200 ("apparatus 200") specially configured in accordance with at least some example embodiments of the present disclosure. In some embodiments, the IT and OT configuration historization system 102 and/or a portion thereof is embodied by one or more system(s), such as the apparatus 200 as depicted and described in FIG. 2. The apparatus 200 includes a processor 202, a non-transitory memory 204, an input/output circuitry 206, a communications circuitry 208, a source data intake circuitry 210, a configuration historization circuitry 212, and an optional asset commanding circuitry 214. In some embodiments, the apparatus 200 is configured, using one or more of the sets of circuitry 202, 204, 206, 208, 210, 212, and/or 214, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with reading, writing, and/or presenting raw and/or processed source data received from a source system, where the source data is tracks observational and/or configuration data on one or more assets related to the source system. In some embodiments, the processor 202 includes hardware, software, firmware, and/or a combination thereof, that receives one or more portions of command data and/or one or more portions of feedback data associated with operation of a particular asset. Additionally or alternatively, in some embodiments, the processor 202 includes hardware, software, firmware, and/or a combination thereof, that determined a command-feedback difference value and/or an absolute data value. Additionally or alternatively, in some embodiments, the processor 202 includes hardware, software, firmware, and/or a combination thereof, that outputs raw and/or processed source data.

In some embodiments, the apparatus 200 includes input/output circuitry 206 that provides output to the user (e.g., via the exposed services 108) and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

The data intake circuitry 210 includes hardware, software, firmware, and/or a combination thereof, that supports receiving data associated with operation of an asset, for example during a command event. For example, in some embodiments, the data intake circuitry 210 includes hardware, software, firmware, and/or a combination thereof, that captures and/or receives feedback data associated with one or more asset(s). The data intake circuitry 210 may communicate with an asset or a sensor associated therewith to receive such feedback data (e.g., via communication network 110). Additionally or alternatively, in some embodiments, the data intake circuitry 210 includes hardware, software, firmware, and/or a combination thereof, that captures and/or receives command data associated with one or more asset(s). The data intake circuitry 210 may communicate with a command system, the asset itself, and/or identify the command data from command(s) transmitted to an asset. Additionally or alternatively, in some embodiments, the data intake circuitry 210 includes hardware, software, firmware, and/or a combination thereof, that requests data from one or more computing device(s), for example from the asset or a sensor, and receives the data in response. Additionally or alternatively, in some embodiments, the data intake circuitry 210 includes hardware, software, firmware, and/or a combination thereof, that identifies an asset type associated with a particular asset. Additionally or alternatively, in some embodiments, the data intake circuitry 210 includes hardware, software, firmware, and/or a combination thereof, that maintains one or more datastore(s) including historically received portions of data. In some embodiments, data intake circuitry 210 includes a separate processor, specially configured field programmable gate array (FPGA), or a specially programmed application specific integrated circuit (ASIC).

The configuration historization circuitry 212 includes hardware, software, firmware, and/or a combination thereof, that supports various functionality associated with receiving, storing, processing, and/or representing particular received data associated with an asset. For example, in some embodiments, the configuration historization circuitry 212 includes hardware, software, firmware, and/or any combination thereof, that configures a dataset associated with a particular asset. In some embodiments, the configuration historization circuitry 212 includes a separate processor, specially configured field programmable gate array (FPGA), or a specially programmed application specific integrated circuit (ASIC).

The optional asset commanding circuitry 214 includes hardware, software, firmware, and/or a combination thereof, that supports various functionality associated with generating and/or transmitting command(s) for controlling operational aspect(s) of at least one asset. In some embodiments, the asset commanding circuitry 214 includes hardware, software, firmware, and/or a combination thereof, that generates command that causes an asset to update one or more operational value(s) towards a commanded target value for particular operational aspect. Additionally or alternatively, in some embodiments, the asset commanding circuitry 214 includes hardware, software, firmware, and/or a combination thereof, that transmits a command to an asset. Additionally or alternatively, in some embodiments, the asset commanding circuitry 214 includes hardware, software, firmware, and/or a combination thereof, that derives command data from generated and/or transmitted command(s) associated with an asset. In some embodiments, the asset commanding circuitry 214 includes a separate processor, specially configured field programmable gate array (FPGA), or a specially programmed application specific integrated circuit (ASIC).

Additionally or alternatively, in some embodiments, two or more of the sets of circuitries 202-214 are combinable. Alternatively or additionally, in some embodiments, one or more of the sets of circuitry perform some or all of the functionality described associated with another component. For example, in some embodiments, two or more of the sets of circuitry 202-214 are combined into a single module embodied in hardware, software, firmware, and/or a combination thereof. Similarly, in some embodiments, one or more of the sets of circuitry, for example the data intake circuitry 210, the data derivation & prediction circuitry 212, and/or the asset commanding circuitry 214, is/are combined with the processor 202, such that the processor 202 performs one or more of the operations described above with respect to each of these sets of circuitry 210-214.

Example Data Flows and Data Architectures of the Disclosure

Having described example systems and apparatuses in accordance with various embodiments of the present disclosure, example data flows and architectures of data in accordance with the present disclosure will now be discussed. In some embodiments, the systems and/or apparatuses described herein maintain data environment(s) that enable the data flows in accordance with the data architectures described herein. For example, in some embodiments, the systems and/or apparatuses described herein function in accordance with the data architecture depicted in FIG. 3, the user interface flow depicted in FIG. 4, and the flow charts depicted in FIGS. 5-14, which are performed or maintained via the IT and OT configuration historization system 102 embodied at least by the apparatus 200.

Figure 3:
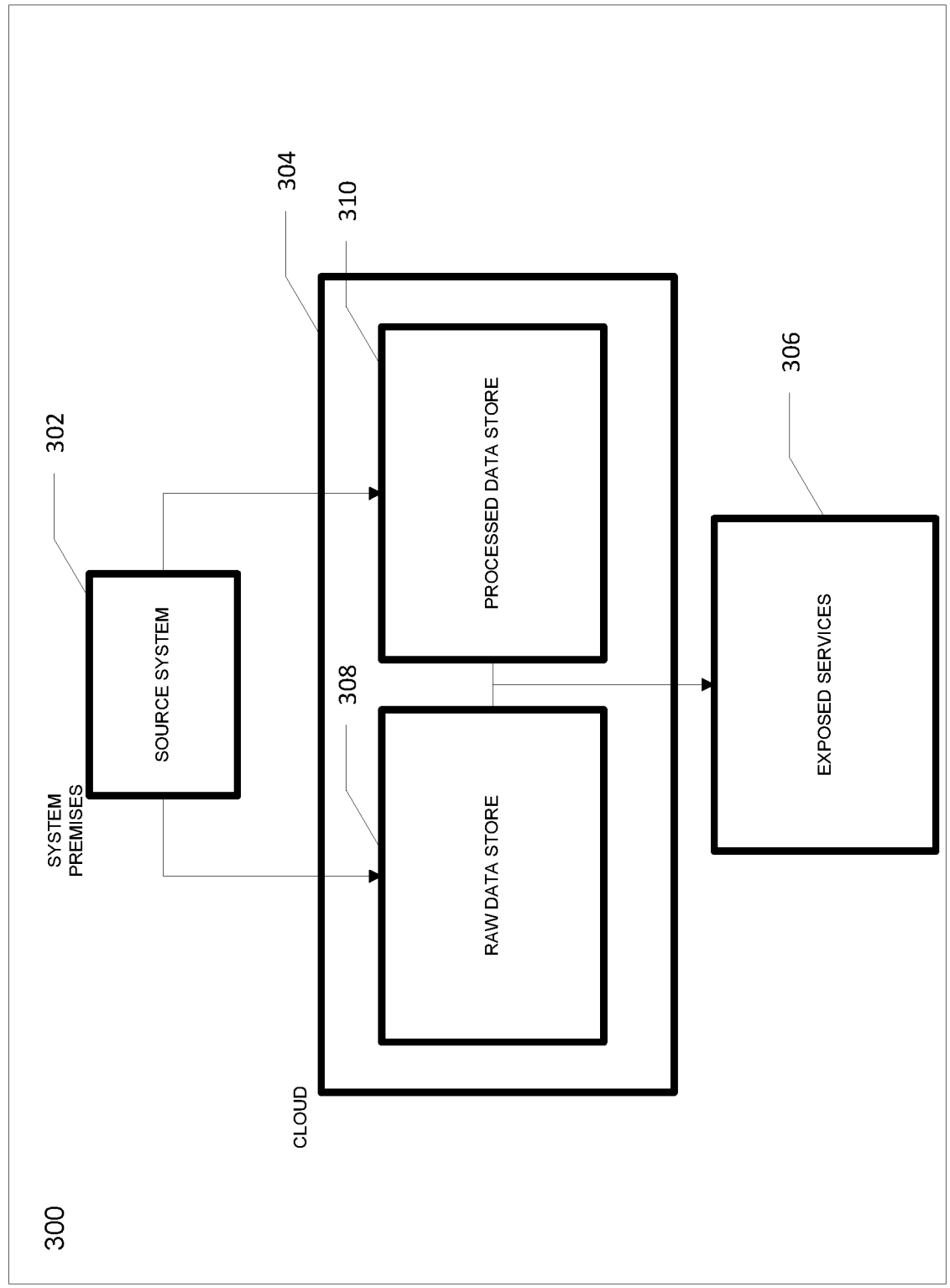
FIG. 3 illustrates an example data architecture in accordance with at least some example embodiments of the present disclosure.

FIG. 3 illustrates a high level data architecture 300 in accordance with at least some example embodiments of the present disclosure. Specifically, FIG. 3 depicts a flow of data between the various computing devices depicted and described in at least FIGS. 1 and 2.

In some embodiments, the source system 302 may transmit data to a cloud computing network 304 or other similar network capable of receiving, storing, and/or transmitting data to one or more exposed services 306.

In some embodiments, the source system 302 may be located on the premises of a manufacturing plant or distribution center. In some embodiments, and as previously described, one or more assets may be tracked, stored, and transmitted by the source system, as previously described. For example, the source system 302 may be a manufacturing plant having one or more temperature sensors, and the source system 302 may be configured to track, store, and transmit data related to the one or more temperature sensors, such as the number of times in a given quarter that a given temperature sensor triggered an overheating alarm. Continuing with the example, in some embodiments, the source system 302 derives from the data that the event represented in the data qualifies for an alarm, and, once the source system 302 decides that the event is an alarm, then it is also classified. Still continuing with the example, in some embodiments, classification may include type of alarm, alarm criticality, etc., and this classification information may be sent to the cloud computing network 304. In some embodiments, the source system 302 may store both observational data (e.g., temperature alarms reported by the one or more temperature sensors) and configuration data (e.g., the temperature at which the sensors should trigger an alarm). In some embodiments, the source system 302 may be configured to represent the observational data contextualized by the configuration data as processed data. In some embodiments, the source data is measured by the source system 302 and directly transmitted from that system.

In some embodiments, the source system 302 may transmit source data to the cloud 304, which may then store in the data in one or more of the raw data store 308 and/or the processed data store 310. In some embodiments, the raw data store 308 may include source data transmitted by the source system 302 that has not been configured or contextualized by any metadata or other configuration data. In some embodiments, the processed data store 310 may include source data from the source system 302 that has been configured and/or contextualized by any metadata or other configuration data. In some embodiments, the cloud computing network 304 may be configured to communicate to the raw data store 308 and/or the processed data store 310 over a secured channel.

Figure 4:
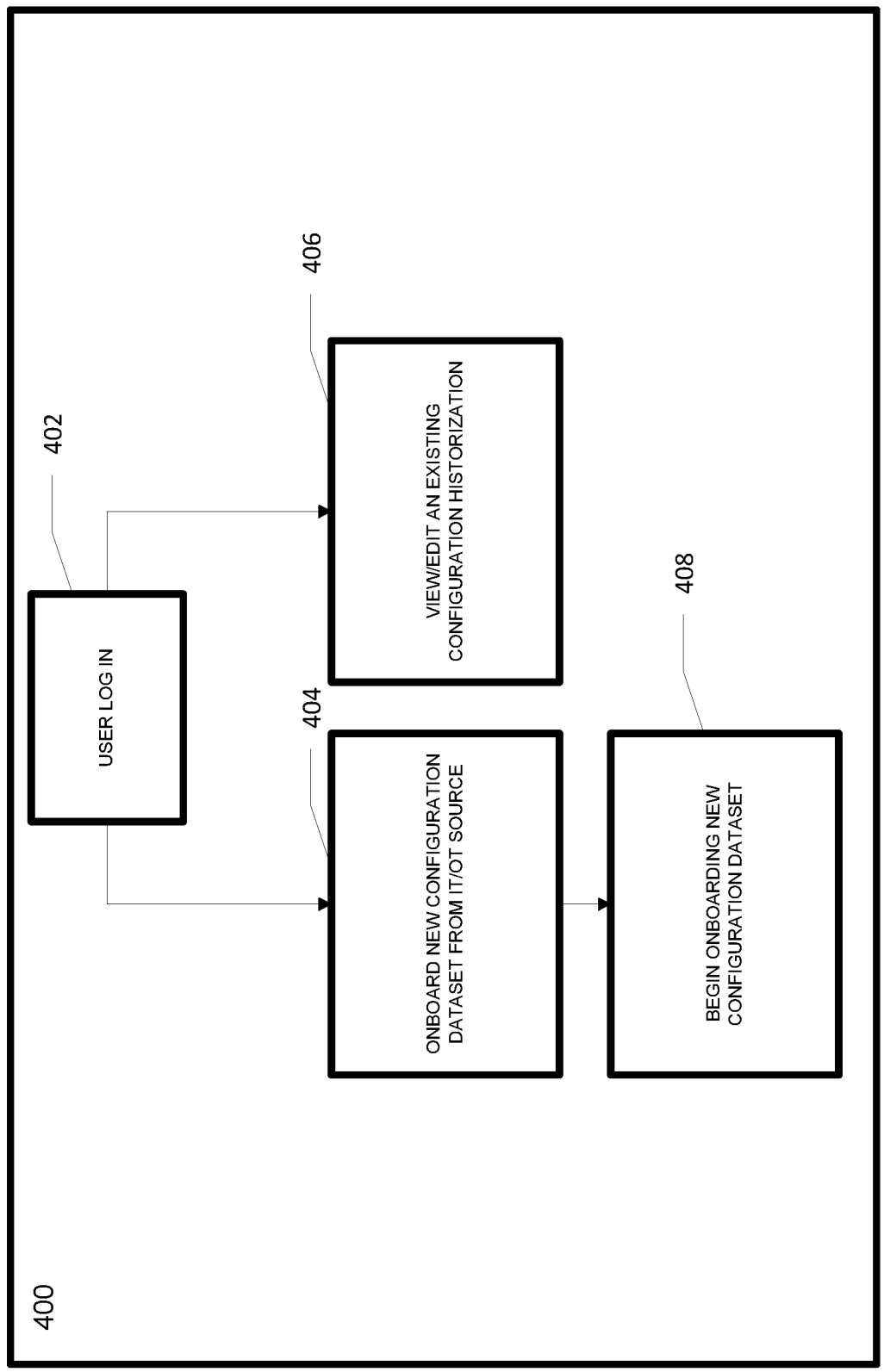
FIG. 4 illustrates an example user interface flow in accordance with at least some example embodiments of the present disclosure.

FIG. 4 illustrates an example user interface (UI) flow 400 for onboarding a dataset from an example source system, according to various embodiments. In some embodiments, the flow 400 may include an initial step 402 of the user logging in to access the interface. In some embodiments, this access may be to one of the aforementioned exposed services 108, 306. In some embodiments, the flow 400 may then request the user to either onboard a new configuration dataset from an IT or OT source 404 or to view and/or edit an existing IT and OT configuration historization 406. In some embodiments, if the user selected to onboard a new configuration dataset from an IT or OT source 404, then the system will prompt the user to begin onboarding a new configuration dataset 408.

Figure 5:
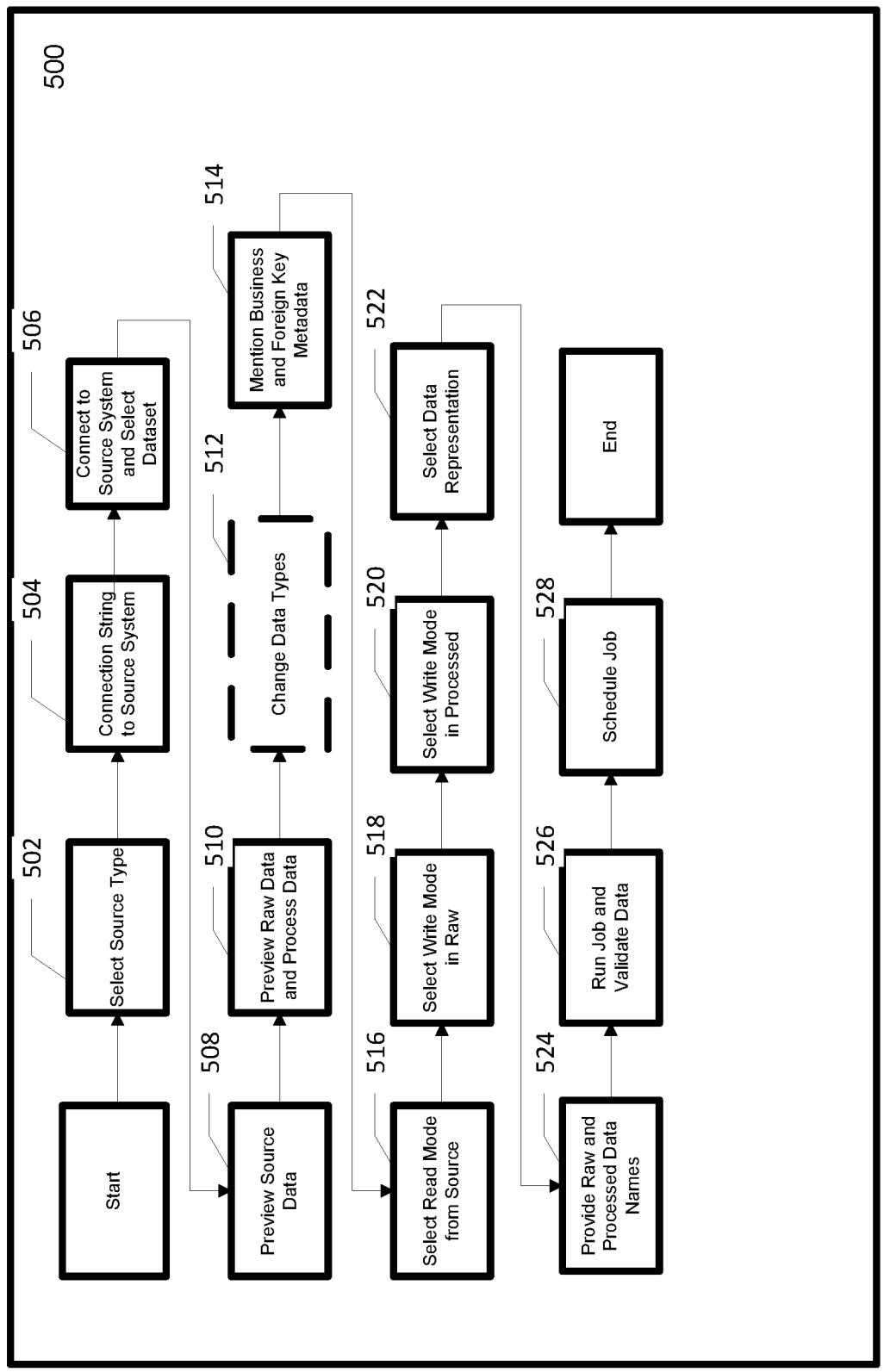
FIG. 5 illustrates an example flow chart for onboarding a new configuration dataset in accordance with at least some example embodiments of the present disclosure.

FIG. 5 illustrates an example flow chart 500 for onboarding a new configuration dataset in accordance with at least some example embodiments of the present disclosure and as previously described at least in respect to FIG. 4. In some embodiments, this new configuration may be received from an example source system, as previously described. For example, the new configuration may include metadata and contextualization for temperature sensors at a manufacturing plant.

In some embodiments, the first step 502 may be selecting a type of data source. In some embodiments, the data source may be .csv files or SQL Server DB. In some embodiments, the second step 504 may be connecting to a source system. In some embodiments, a user may need to input a connection string (e.g., a user ID and password) to connect to the source system. In some embodiments, the source system may be located, or its data may be stored, on the premises where it is being accessed by the user. In some embodiments, a user may not need to input the connection string.

In some embodiments, the third step 506 may be connecting to a source system and selecting a dataset. In some embodiments, the dataset may be a table of data. In some embodiments, the dataset may include source data including observational data and configuration data that contextualizes the observational data. In some embodiments, the fourth step 508 may be previewing the source data. In some embodiments, when the dataset is a table of data, the source system may preview the dataset in a preview pane showing, for example, the first N rows with header info from the source system. In some embodiments, the fifth step 510 may preview the raw source data and the processed source data; that is, the preview may be of the data prior to processing and the data post processing. In some embodiments, there may be a sixth step 512 of changing source types of data (i.e., repeating step 502).

In some embodiments, there may be a sixth step 514 of mentioning business and foreign key metadata. In some embodiments, these metadata may provide additional detail contextualizing the source data. In some embodiments, there may be a seventh step of selecting a read mode for the source data 516. In some embodiments, the read mode may be for reading both the raw and processed data. In some embodiments, the read mode may be "full" mode or "delta" mode. In some embodiments, full mode may show all of the source data. In some embodiments, delta mode may read changes to the source data since the source data was received from the source system. In some such embodiments, the delta mode determines and/or tracks only the changes to the source data. In some embodiments, delta mode may show a watermark indicated by the type of data (e.g., int, float, timestamp, etc.).

In some embodiments, there may be an eight step 518 and a ninth step 520 of selecting a write mode for the raw data 518 and selecting a write mode for the processed data 520. In some embodiments, the write mode may be truncate/load, append, change data capture (CDC), and/or merge. In some embodiments, there may be a tenth step 522 of selecting data representation. In some embodiments, step 522 may include selecting a representation mode for representing the processed source data. In some embodiments, the representation may take several forms. In some embodiments, the data may be represented "AS IS"; that is, the data may be represented as the raw data. In some embodiments, the data may be represented "AS IS" but with master data versioning.

In some embodiments, there may an eleventh step 524 of providing raw and processed data names. In some embodiments, this may allow a user to further configure the raw and processed data once it has been received from the source system. In some embodiments, when the dataset is represented in a table, step 524 may be providing names of the tables containing the raw and processed data. In some embodiments, there may be a twelfth step 526 of running the job and validating the data. In some embodiments, running the job may include processing the raw data according to various preset configuration parameters. In some embodiments, validating the data may include comparing the processed raw data to the processed data received from the source system. In some embodiments, alternatively or in addition to step 526, there may be a thirteenth step 528 of scheduling a job such that step 526 is performed at a preset time. In some embodiments, step 528 may be scheduled to repeat at set intervals such that the source data from the source system is continually updated.

Example Methods of the Disclosure

Having described example systems and apparatuses in accordance with various embodiments of the present disclosure, example flow charts illustrating example methods for configuring source data from a source system in accordance with at least some example embodiments of the present disclosure will now be discussed. In some embodiments, the flowcharts depicts an example computer-implemented method 600 that is performable by one or more of the apparatuses, systems, devices, and/or computer program products described herein, for example utilizing one or more of the specially configured components thereof. In some embodiments, the example method 600 may be implemented using any suitable system and apparatus, as desired.

The blocks indicate operations of each process. Such operations may be performed in any of a number of ways, including, without limitation, in the order and manner as depicted and described herein. In some embodiments, one or more blocks of any of the methods described herein occur in-between one or more blocks of another process, before one or more blocks of another process, in parallel with one or more blocks of another methods, and/or as a sub-method of a second method. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 6:
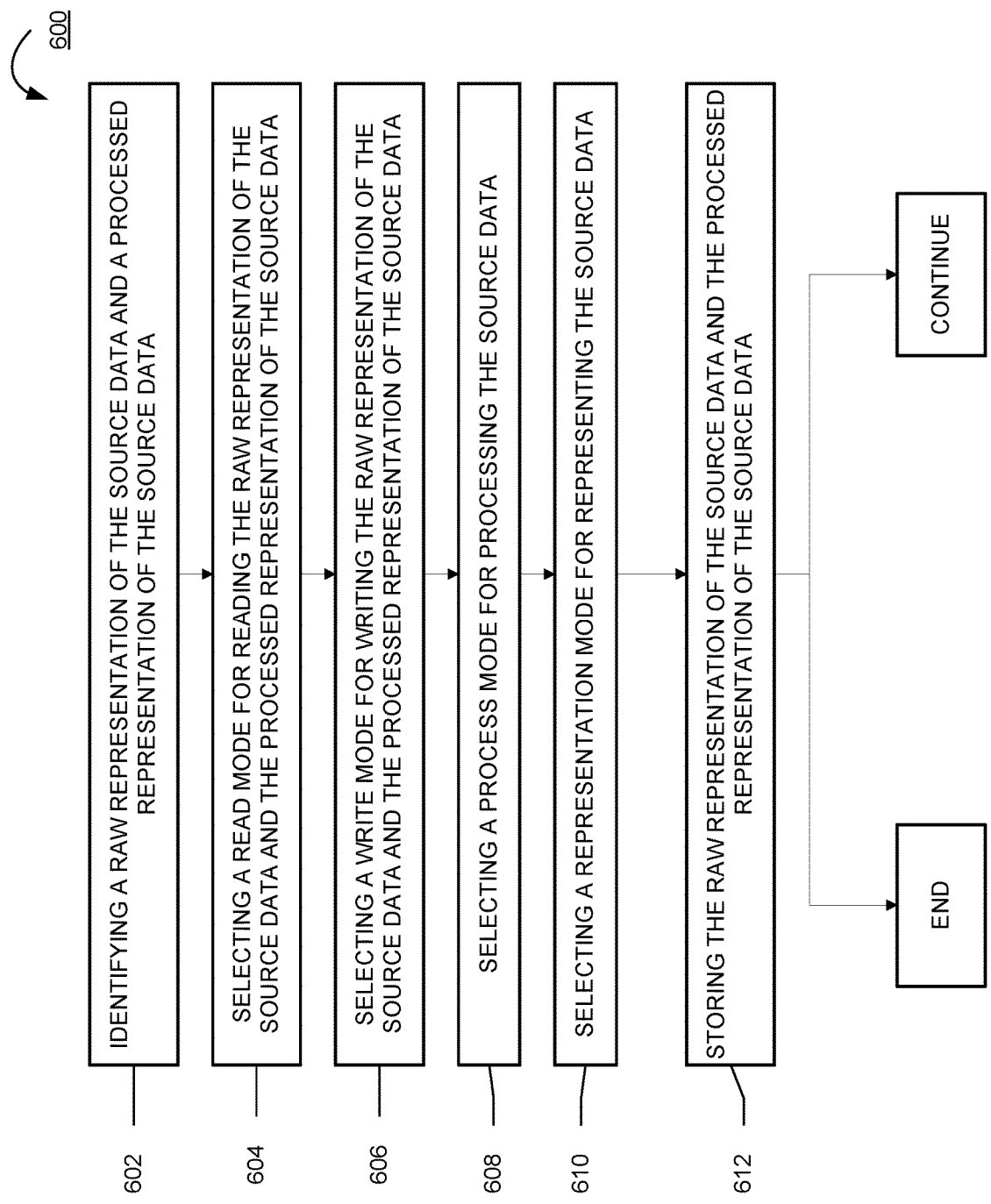
FIG. 6 illustrates an example flow chart for configuring source data from a source system in accordance with at least some example embodiments of the present disclosure.

In some embodiments, referring now to at least FIG. 6, the method 600 may include a step 602 of identifying a raw representation of the source data and a processed representation of the source data. In some embodiments, this source data may come from a source system, such as a manufacturing plant or distribution center.

In some embodiments, the method 600 may include a step 604 of selecting a read mode for reading the raw representation of the source data and the processed representation of the source data, wherein the read mode is based at least in part on the identified raw representation and the processed representation of the source data. In some embodiments, the read mode may be a "delta" mode or a full mode, as previously described.

In some embodiments, the method 600 may include a step 606 of selecting a write mode for writing the raw representation of the source data and the processed representation of the source data, wherein the write mode is based at least in part on the read mode. In some embodiments, the write mode may be a truncate/load, append, CDC, and/or merge modes, as previously described. In some embodiments, truncate/load may write the source data over any existing (i.e., previously identified source data) data in an example table. In some embodiments, append may add the source data to any existing data in an example table. In some embodiments, CDC and/or merge may update any existing data in an example table with the source data identified in step 602. It will be understood that various different write modes may be utilized for raw and processed representations of the source data depending on the needs and desires of a user.

In some embodiments, the method 600 may include a step 608 of selecting a process mode for processing the source data, wherein the process mode is based at least in part on the write mode. In some embodiments, the process mode may be "as is"; that is, the process mode may create a simple view of the source data, similar to the raw version of the data. In some embodiments, when the write mode selected is either append, CDC, or merge, the process mode may be "as is with master data versioning"; that is, new records and changed records may be added to the processed data to reflect changes to the raw data. In some embodiments, the new records may reflect new source data, while the changed records may reflect changes to previously identified source data. In some embodiments, the new records and changed records may be added in two new columns (SCD2). In some embodiments, a timestamp (or timestamps) may be added to the processed data to properly "version" the processed source data. In some embodiments, the timestamp(s) may be added in its (their) own column.

In some embodiments, the method 600 may include a step 610 of selecting a representation mode for representing the processed source data. In some embodiments, the representation mode may be based at least in part on the processed mode selected in step 608. For example, source data processed "as is" will be represented differently (i.e., a simple view of the raw data) than source data processed "as is with master data versioning." In some embodiments, the method 600 may include a step 612 of storing the raw representation of the source data and the processed representation of the source data based at least in part on the representation mode. That is, in some embodiments, the data may be stored similarly to how it was represented as described in step 610.

Figure 7:
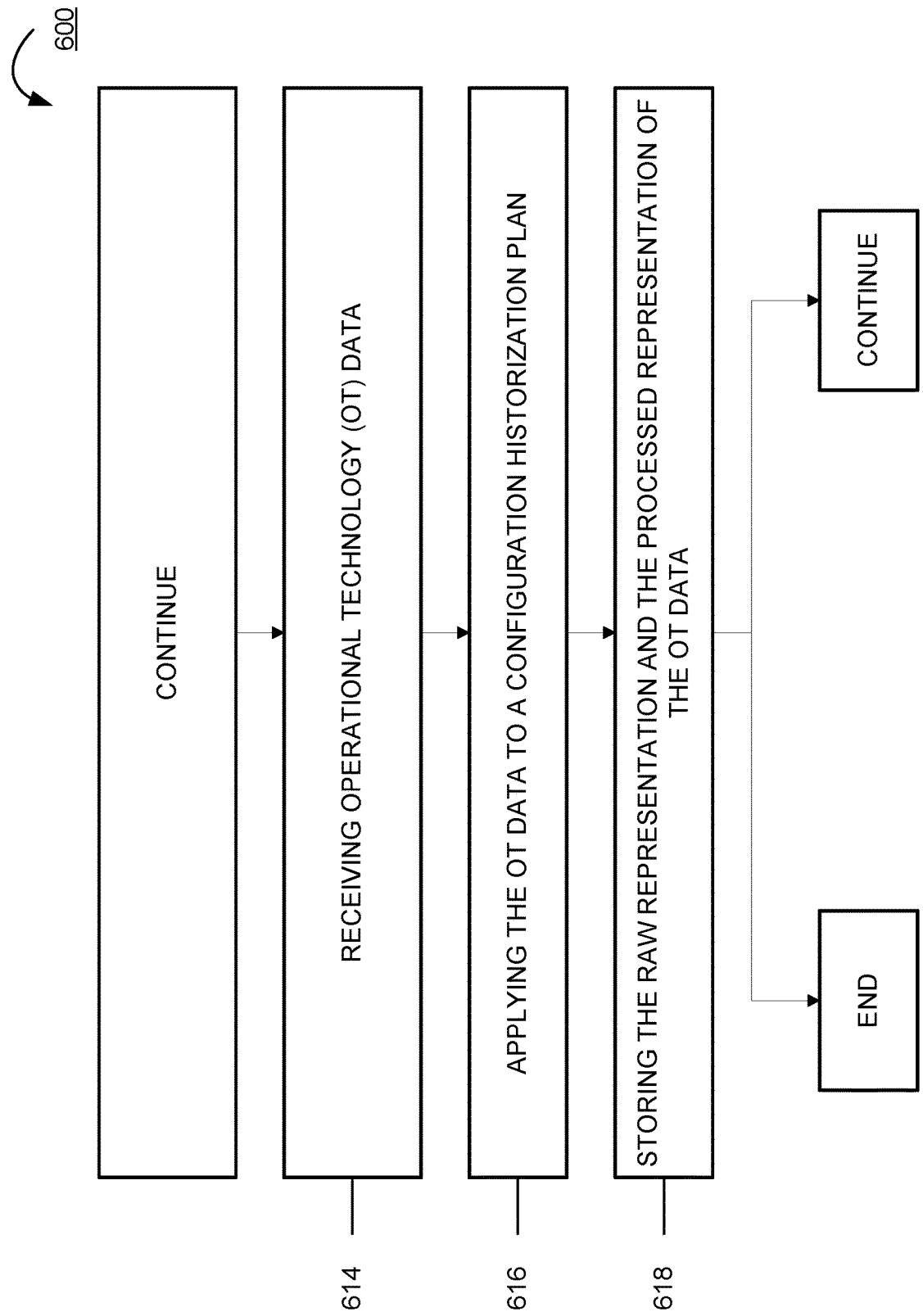
FIG. 7 illustrates an example flow chart for configuring source data from a source system in accordance with at least some example embodiments of the present disclosure.

In some embodiments, referring now to at least FIG. 7, the method 600 may include a step 614 of receiving operational technology (OT) data. In some embodiments, the OT data may be source data from a manufacturing or industrial environment. In some embodiments, this data may be similar to source data as described previously (i.e., similar in type to the data identified in step 602, described above). In some embodiments, the method 600 may include a step 616 of applying the OT data to a configuration historization plan where the configuration historization plan is configured to provide a raw representation and a processed representation of the OT data. In some embodiments, applying the OT data to the configuration historization plan may be performed across a variety of OT systems, thereby synthesizing source data from various source systems and uniformly representing them on exposed services for various users. In some embodiments, the method 600 may include a step 618 of storing the raw representation and the processed representation of the OT data. In some embodiments, the stored source data may be used to configure or update a configuration historization plan with new source data.

Figure 8:
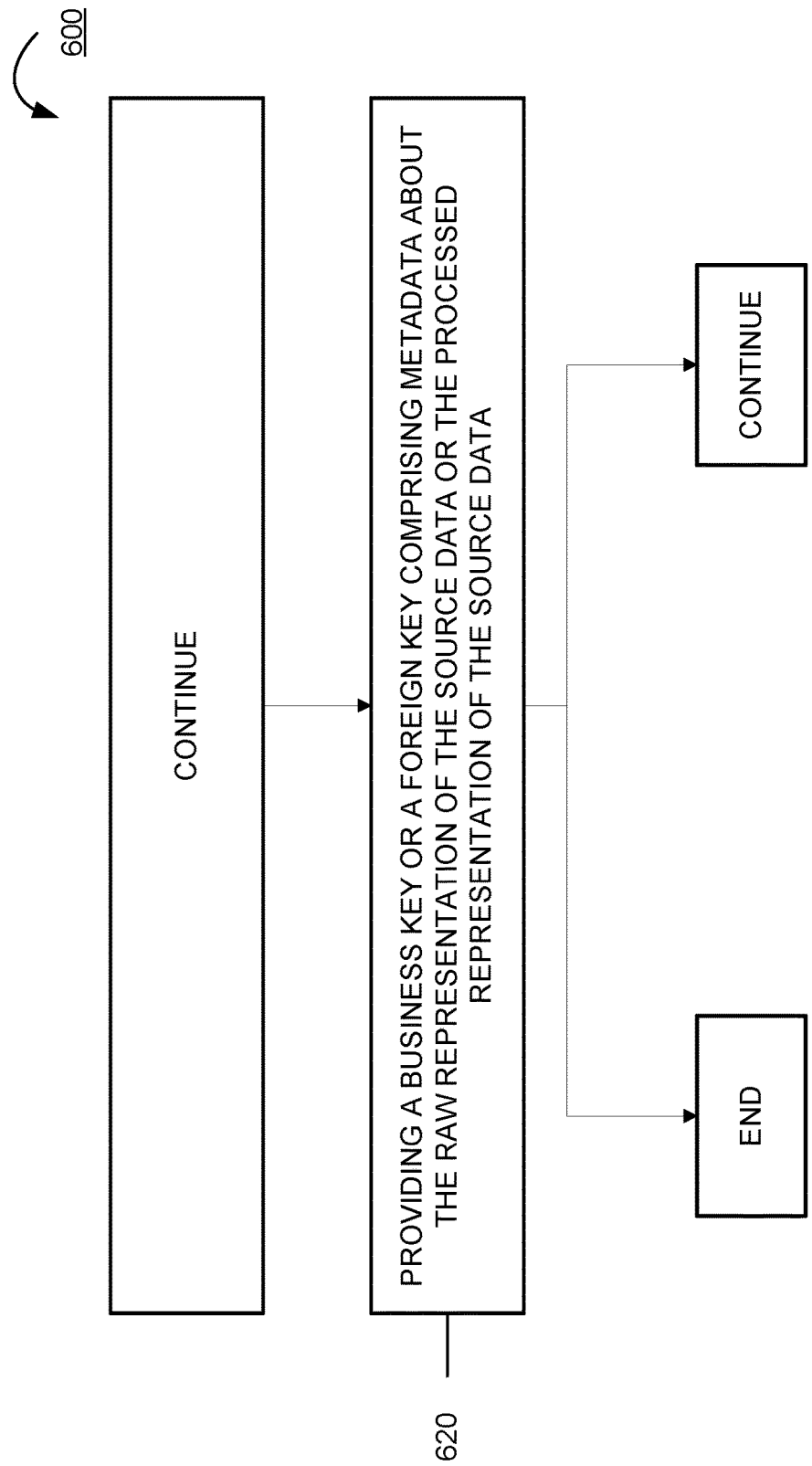
FIG. 8 illustrates an example flow chart for configuring source data from a source system in accordance with at least some example embodiments of the present disclosure.

In some embodiments, referring now to at least FIG. 8, the method 600 may include a step 620 of providing a business key or a foreign key comprising metadata about the raw representation of the source data or the processed representation of the source data. In some embodiments, the business key or foreign key and associated metadata may be used to further configure the source data identified from the source system. In some embodiments, the business and/or foreign key may be used to configure or update the configuration historization system to better synthesize data across various source systems.

Figure 9:
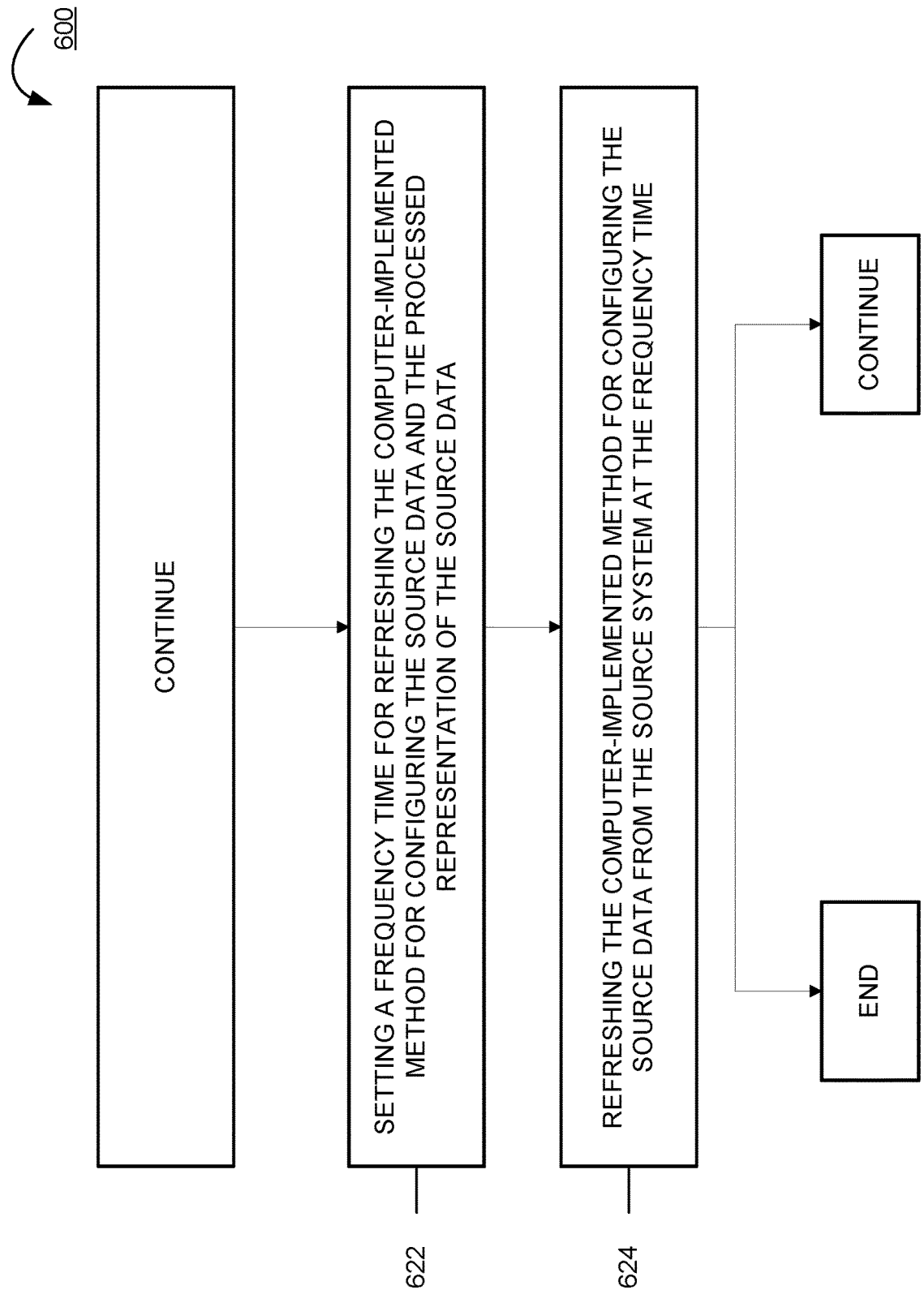
FIG. 9 illustrates an example flow chart for configuring source data from a source system in accordance with at least some example embodiments of the present disclosure.

In some embodiments, referring now to at least FIG. 9, the method 600 may include a step 622 of setting a frequency time for refreshing the computer-implemented method for configuring the source data and the processed representation of the source data. For example, the source data and the processed representation may be configured to be updated daily, weekly, or monthly, depending on the needs of the user. In some embodiments, the method 600 may include a step 624 of refreshing the computer-implemented method for configuring the source data from the source frequency at the frequency time. In some embodiments, the refreshing may be done manually be a user (e.g., reinitiating the computer-implemented method at discrete times) and/or the refreshing may be done on an automatic basis (e.g., every day, week, month, quarter, etc.).

Figure 10:
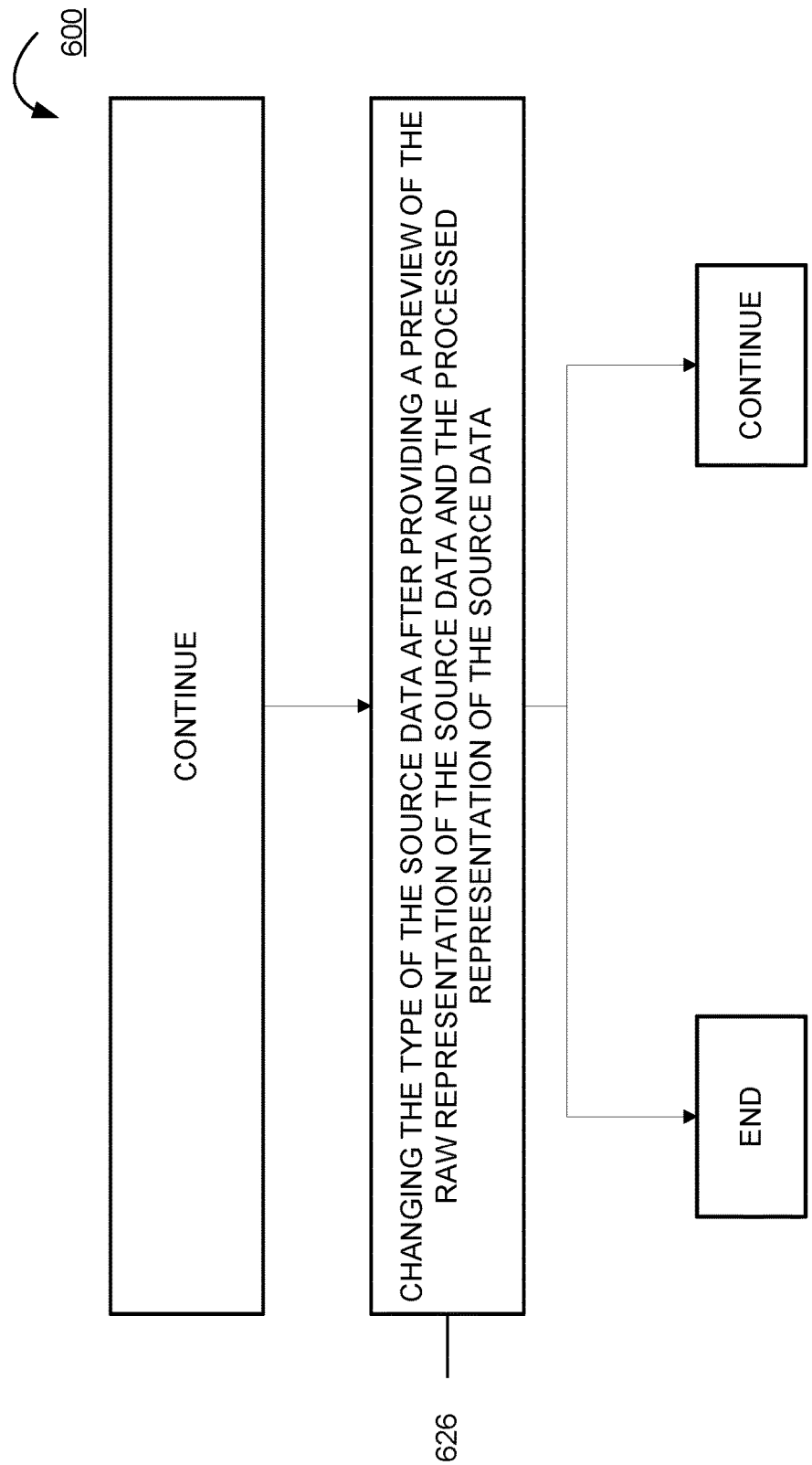
FIG. 10 illustrates an example flow chart for configuring source data from a source system in accordance with at least some example embodiments of the present disclosure.

In some embodiments, referring now to at least FIG. 10, the method 600 may include a step 626 of changing the type of the source data after providing a preview of the raw representation of the source data and the processed representation of the source data. In some embodiments, after previewing the raw representation of the source data and/or the processed representation of the source data, the user may wish to change the data type based on the preview. For example, a user may preview the data as .csv files and then request the data type change to SQL Server DB type.

Figure 11:
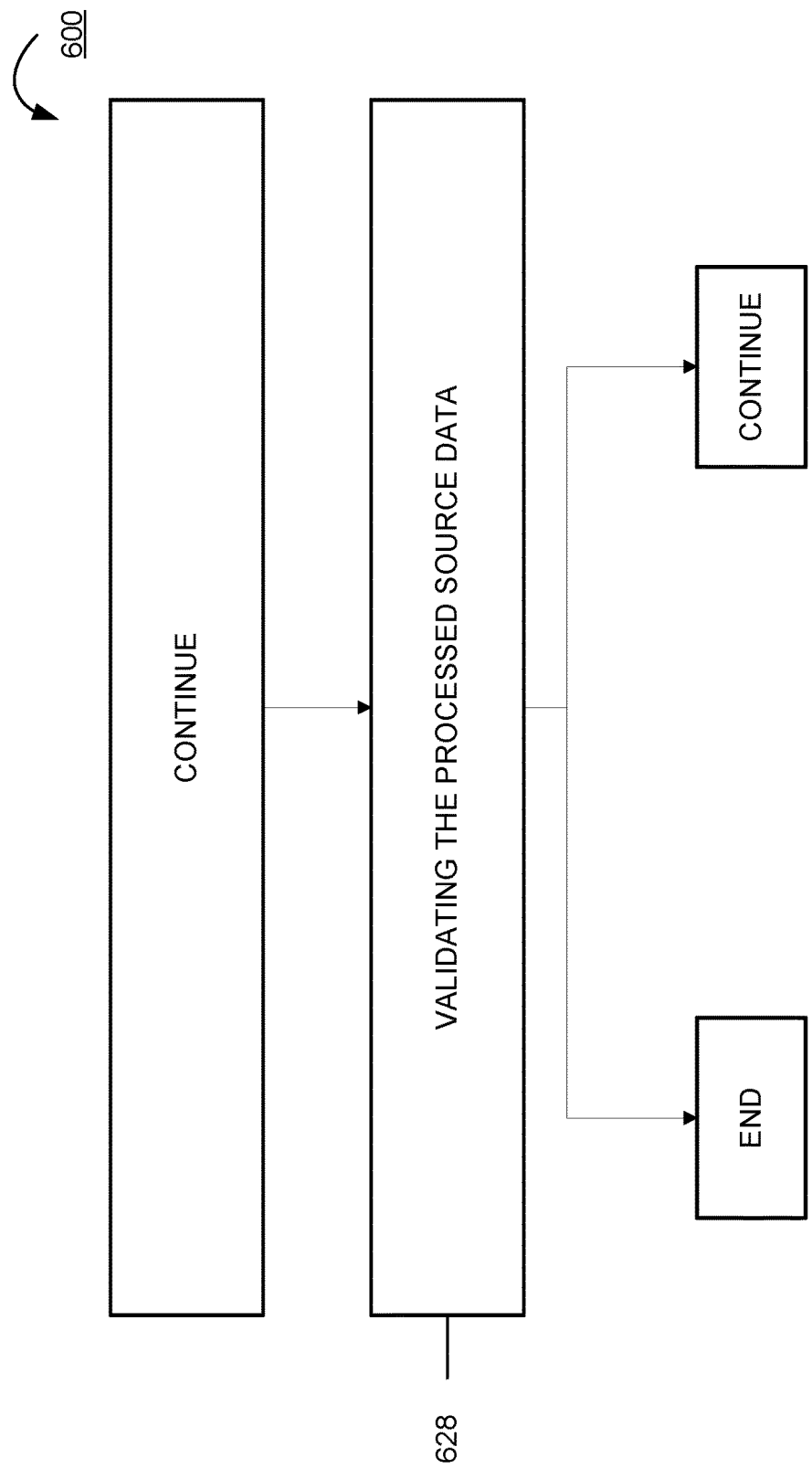
FIG. 11 illustrates an example flow chart for configuring source data from a source system in accordance with at least some example embodiments of the present disclosure.

In some embodiments, referring now to at least FIG. 11, the method 600 may include a step 628 of validating the processed source data. In some embodiments, data are validated by comparing the processed raw data to the processed data received from the source system. In some embodiments, an operator may validate the data after processing.

Figure 12:
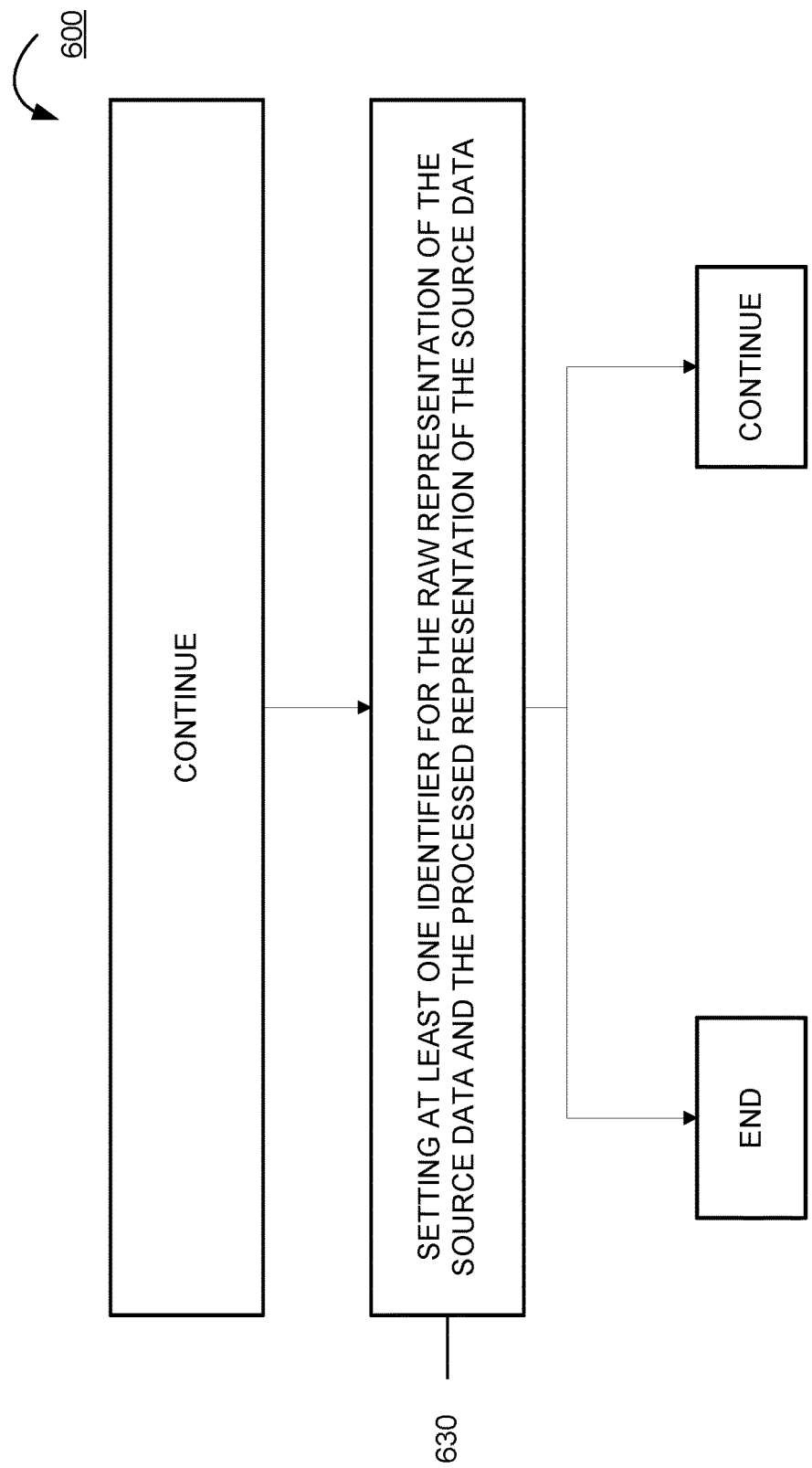
FIG. 12 illustrates an example flow chart for configuring source data from a source system in accordance with at least some example embodiments of the present disclosure.

In some embodiments, referring now to at least FIG. 12, the method 600 may include a step 630 of setting at least one identifier for the raw representation of the source data and the processed representation of the source data. In some embodiments, the identifier may be a title or label for a table containing the raw representation of the source data and for a table containing the processed representation of the source data.

Figure 13:
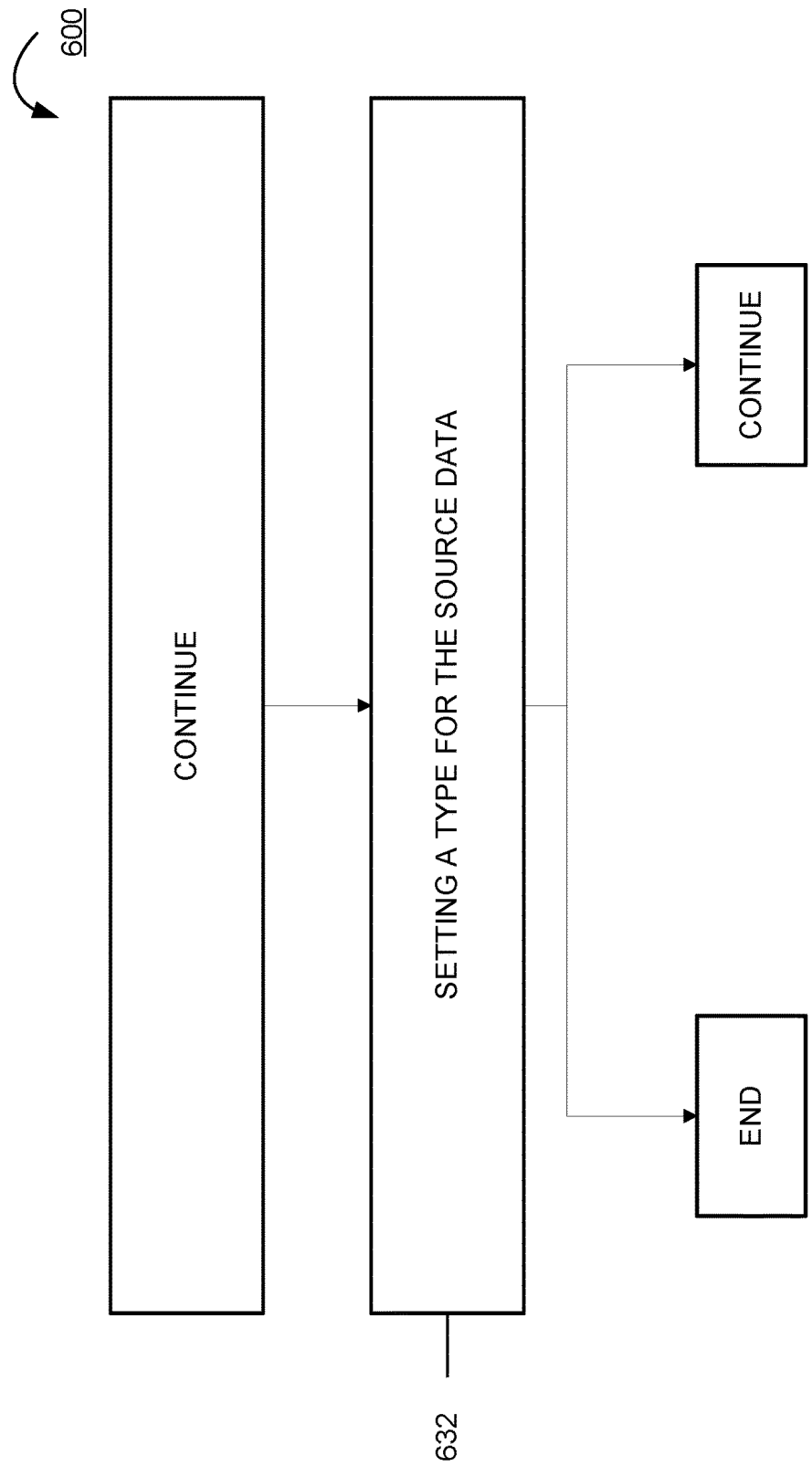
FIG. 13 illustrates an example flow chart for configuring source data from a source system in accordance with at least some example embodiments of the present disclosure.

In some embodiments, referring now to at least FIG. 13, the method 600 may include a step 632 of setting a type for the source data. In some embodiments, the type of data source may be .csv files or SQL Server DB, as previously described.

In some embodiments, referring now to at least FIG. 14, the method 600 may include a step 634 of requesting a connection string to the source system. In some embodiments, the connection string may be a username and password required for a user to access the source system. In some embodiments, various forms of connection strings may be used to authorize access besides usernames and passwods. In some embodiments, the method 600 may include a step 636 of receiving the connection string. In some embodiments, the method 600 may include a step 638 of authenticating the connection string. In some embodiments, the method 600 may include a step 640 of providing access to the source system.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for configuring source data from a source system, the computer-implemented method comprising:
   identifying a raw representation of the source data and a processed representation of the source data, wherein the processed representation of the source data comprises configuration data indicative of a type of configuration utilized to map a plurality of source data types to a shared processed representation, wherein the shared processed representation represents each source data type of the plurality of source data types in an identical configuration, wherein the configuration data comprises a business key and a foreign key comprising metadata associated with the raw representation of the source data and the processed representation of the source data, wherein the metadata is used to configure the source data identified from the source system;

selecting a read mode for reading the raw representation of the source data and the processed representation of the source data, wherein the read mode is based at least in part on the identified raw representation and the processed representation of the source data;

selecting a write mode for writing the raw representation of the source data and the processed representation of the source data, wherein the write mode is based at least in part on the read mode;

selecting a process mode for processing the source data, wherein the process mode is based at least in part on the write mode;

selecting a representation mode for representing the processed source data; and storing the raw representation of the source data and the processed representation of the source data based at least in part on the representation mode.

2. The computer-implemented method of claim 1, further comprising:

receiving operational technology (OT) data;

applying the OT data to a configuration historization plan, wherein the configuration historization plan is configured to provide a raw representation and a processed representation of the OT data; and storing the raw representation and the processed representation of the OT data.

3. The computer-implemented method of claim 1, wherein the processed representation comprises data indicative of a current configuration utilized to store at least a portion of the source data at a time that the portion of the source data was stored.

4. The computer-implemented method of claim 1, further comprising: setting a frequency time for refreshing the configuration of the source data from the source system, wherein the frequency time is a predetermined interval to refresh the configuration of the source data; and refreshing the configuration of the source data from the source system at the frequency time.

5. The computer-implemented method of claim 1, further comprising changing a type of the source data after providing a preview of the raw representation of the source data and the processed representation of the source data, wherein the preview is configured to identify at least a portion of the raw representation of the source data and at least a portion of the processed representation of the source data.

6. The computer-implemented method of claim 1, further comprising validating the processed source data by comparing the processed source data to processed raw data.

7. The computer-implemented method of claim 1, further comprising setting at least one identifier for the raw representation of the source data and processed representation of the source data.

8. The computer-implemented method of claim 1, further comprising setting a type for the source data.

9. The computer-implemented method of claim 1, wherein the source data comprises at least one CSV file or at least one SQL Server DB.

10. The computer-implemented method of claim 1, further comprising requesting a connection string to connect to the source system, receiving the connection string, authenticating the connection string, and providing access to the source system based at least in part on the authenticating the connection string.

11. The computer-implemented method of claim 10, wherein the connection string includes a user identification and password.

12. The computer-implemented method of claim 1, wherein the read mode comprises a full mode and a delta mode, wherein the delta mode indicate a watermark comprising a data type selected from a group consisting of int, float, and timestamp.

13. The computer-implemented method of claim 1, wherein the write mode comprises truncate/load, append, change data capture, and merge.

14. A computer program product for configuring source data from a source system, the computer program product comprising at least one non-transitory computer-readable storage medium having computer program code stored thereon that, in execution with at least one processor, is configured for:

selecting a read mode for reading a raw representation of the source data and a processed representation of the source data, wherein the read mode is based at least in part on the identified raw representation and the processed representation of the source data, wherein the processed representation of the source data comprises configuration data indicative of a type of configuration utilized to map a plurality of source data types to a shared processed representation, wherein the shared processed representation represents each source data type of the plurality of source data types in an identical configuration, wherein the configuration data comprises a business key and a foreign key comprising metadata associated with the raw representation of the source data and the processed representation of the source data, wherein the metadata is used to configure the source data identified from the source system;

selecting a write mode for writing the raw representation of the source data and the processed representation of the source data, wherein the write mode is based at least in part on the read mode;

selecting a process mode for processing the source data, wherein the process mode is based at least in part on the write mode;

selecting a representation mode for representing the processed source data; and storing the raw representation of the source data and the processed representation of the source data based at least in part on the representation mode.

15. The computer program product of claim 14, wherein the at least one processor is configured for:

receiving operational technology (OT) data;

applying the OT data to a configuration historization plan, wherein the configuration historization plan is configured to provide a raw representation and a processed representation of the OT data; and storing the raw representation and the processed representation of the OT data.

16. An apparatus for configuring source data from a source system, the apparatus comprising at least one processor and at least one non-transitory memory including computer-coded instructions thereon, wherein the computer coded instructions, with the at least one processor, cause the apparatus to:

selecting a read mode for reading the raw representation of the source data and the processed representation of the source data, wherein the read mode is based at least in part on the identified raw representation and the processed representation of the source data, wherein the processed representation of the source data comprises configuration data indicative of a type of configuration utilized to map a plurality of source data types to a shared processed representation, wherein the shared processed representation represents each source data type of the plurality of source data types in an identical configuration, wherein the configuration data comprises a business key and a foreign key comprising metadata associated with the raw representation of the source data and the processed representation of the source data, wherein the metadata is used to configure the source data identified from the source system;

selecting a write mode for writing the raw representation of the source data and the processed representation of the source data, wherein the write mode is based at least in part on the read mode;

selecting a process mode for processing the source data, wherein the process mode is based at least in part on the write mode;

selecting a representation mode for representing the processed source data; and storing the raw representation of the source data and the processed representation of the source data based at least in part on the representation mode.

17. The apparatus of claim 16, wherein the computer coded instructions, with the at least one processor, are further configured to cause the apparatus to:

receive operational technology (OT) data;

apply the OT data to a configuration historization plan, wherein the configuration historization plan is configured to provide a raw representation and a processed representation of the OT data; and store the raw representation and the processed representation of the OT data.

18. The computer-implemented method of claim 1, further comprising configuring and historizing the source data from the source system, and wherein the business key and the foreign key are used to update the configuration of a historization system to synthesize data across one or more source systems.

* * * * *